(12) United States Patent
Lemke

(10) Patent No.: US 10,981,658 B2
(45) Date of Patent: Apr. 20, 2021

(54) PERSONNEL CARRYING DEVICES

(71) Applicant: Ascent Helicopters Ltd., Parksville (CA)

(72) Inventor: Trent Lemke, Qualicum Beach (CA)

(73) Assignee: Ascent Aerospace Ltd.

( * ) Notice: Subject to any disclaimer, the term of this patent is extended or adjusted under 35 U.S.C. 154(b) by 0 days.

(21) Appl. No.: 16/703,100

(22) Filed: Dec. 4, 2019

(65) Prior Publication Data
US 2020/0140100 A1 May 7, 2020

Related U.S. Application Data

(63) Continuation of application No. 15/321,342, filed as application No. PCT/CA2015/050581 on Jun. 23, 2015, now Pat. No. 10,532,819.

(30) Foreign Application Priority Data

Jun. 23, 2014 (CA) ..................................... 2854894

(51) Int. Cl.
*B64D 25/06* (2006.01)
*B64D 1/22* (2006.01)
(Continued)

(52) U.S. Cl.
CPC .............. *B64D 25/06* (2013.01); *B64C 27/04* (2013.01); *B64D 1/22* (2013.01); *H02G 1/02* (2013.01)

(58) Field of Classification Search
CPC . B64D 25/06; B64D 1/22; H02G 1/02; B64C 27/04
See application file for complete search history.

(56) References Cited

U.S. PATENT DOCUMENTS 2,700,781 A    2/1955   Smith
4,398,760 A * 8/1983   Kirk ....................... B66C 1/127
                                                                       294/77

(Continued)

FOREIGN PATENT DOCUMENTS

DE    202008006773 U1    2/2009
FR          2922437 A1    4/2009
(Continued)

OTHER PUBLICATIONS

Canadian Intellectual Property Office, International Search Report and Written Opinion in PCT Application No. PCT/CA2015/050581, dated Sep. 3, 2015.
(Continued)

*Primary Examiner* — Assres H Woldemaryam
(74) *Attorney, Agent, or Firm* — Wood Herron & Evans LLP

(57) ABSTRACT

Apparatus and methods for supporting human external cargo from the hoist of a hoist-equipped helicopter are provided. The apparatus has at least one personal harness for supporting a user; and at least one harness segment with a top end point attachable to the helicopter hoist through an attachable fitting and at least one bottom end point directly or indirectly attachable to the personal harness. The harness segment, and the personal harness externally support the user from the helicopter hoist and allows the user to be safely suspended from the helicopter in order for work or rescue operations to be administered by the user.

13 Claims, 7 Drawing Sheets

(51) Int. Cl.
*H02G 1/02* (2006.01)
*B64C 27/04* (2006.01)

(56) References Cited

U.S. PATENT DOCUMENTS

| | | | | |
|---|---|---|---|---|
| 4,478,312 A | * | 10/1984 | Kurtgis | H02G 1/02 182/142 |
| 4,673,059 A | * | 6/1987 | Kurtgis | A62B 35/04 182/142 |
| 4,883,301 A | * | 11/1989 | Pugh | A62B 1/02 294/77 |
| 5,160,286 A | * | 11/1992 | Hill | B63C 9/02 182/142 |
| 5,417,304 A | * | 5/1995 | Kurtgis | B64D 1/18 182/150 |
| 5,487,444 A | * | 1/1996 | Dennington | A62B 35/04 182/6 |
| 6,123,049 A | * | 9/2000 | Slater | A01K 27/002 119/850 |
| 6,367,583 B1 | * | 4/2002 | Derby | A62B 35/0018 119/857 |
| 6,467,573 B1 | * | 10/2002 | Parker | A62B 35/0075 182/3 |
| 8,746,739 B2 | | 6/2014 | Meggs et al. | |
| 2004/0050343 A1 | * | 3/2004 | Kurtgis | B64D 1/12 119/710 |
| 2005/0192159 A1 | * | 9/2005 | Jackson | A61H 3/008 482/23 |
| 2008/0184488 A1 | * | 8/2008 | Fee | A61G 1/01 5/628 |
| 2010/0252365 A1 | * | 10/2010 | Feller | B66C 1/12 182/231 |
| 2012/0024627 A1 | * | 2/2012 | Harshbarger | A62B 35/0006 182/5 |
| 2012/0325586 A1 | * | 12/2012 | Meggs | A61G 7/1042 182/231 |
| 2014/0020183 A1 | * | 1/2014 | Dominick | A61G 1/013 5/627 |
| 2014/0361055 A1 | * | 12/2014 | Myers | A62B 35/0018 224/160 |

FOREIGN PATENT DOCUMENTS

| | | |
|---|---|---|
| WO | 9103221 A1 | 3/1991 |
| WO | 9421328 A1 | 9/1994 |

OTHER PUBLICATIONS

The International Bureau of WIPO, International Preliminary Report on Patentability in PCT/CA2015/050581, dated Dec. 27, 2016.
European Patent Office, Supplementary European Search Report in EP Application No. 15812774.6, dated Jan. 22, 2018.
Falltech, Restraint Lanyards, User Instruction Manual, 2013, 22 pgs.

* cited by examiner

PERSONNEL CARRYING DEVICES

CROSS REFERENCE TO RELATED APPLICATIONS

This application is a continuation of U.S. patent application Ser. No. 15/321,342, filed Dec. 22, 2016 (pending), which is a U.S. National Phase Application of International Application No. PCT/CA2015/050581, filed Jun. 23, 2015 (expired), which claimed the benefit of Canadian Patent Application No. 2,854,894, filed Jun. 23, 2014, the disclosures of which are incorporated by reference herein in their entirety.

FIELD OF INVENTION

The present invention relates generally to helicopter accessories. More specifically, the invention relates to an apparatus and methods for supporting human external cargo from the hoist of a hoist-equipped helicopter.

BACKGROUND OF THE INVENTION

Workplace health and safety is a primary concern in all industrial operations. Ensuring a safe working environment for personnel can be challenging, especially in situations where workers must access hazardous or difficult to reach sites. In the energy industry, for example, workers often need to gain access to remote locations to perform repairs, maintenance, or related functions. Elevated equipment, such as that associated with electrical power lines, presents a particular challenge in terms of worker accessibility. In many cases, even if personnel were able to access these elevated, remote, or otherwise difficult to reach locations, they would encounter unsafe working conditions that interfere with their operations.

In many industries, workplace health and safety guidelines and regulations have been developed to improve worker safety. When performing operations at elevated, remote, or otherwise dangerous or inaccessible sites, it can be very difficult to comply with safety regulations and protocols. As such, a need exists for improved apparatus and methods allowing personnel to access elevated, dangerous, remote, and/or otherwise inaccessible sites while maintaining levels of safety in compliance with workplace safety guidelines and regulations.

Improved apparatus and methods for supporting personnel at difficult to access locations is highly sought-after in nearly all industry sectors.

SUMMARY OF INVENTION

According to an aspect of the present invention there is provided an apparatus for supporting human external cargo from a hoist of a hoist-equipped helicopter. The apparatus comprising: a personal harness for supporting a user; and a harness component with at least a top end and at least one bottom end. The at least one bottom end of the harness component is attachable to the personal harness, and the at least one top end of the harness component is attachable to a fitting of the helicopter hoist. The helicopter and hoist support the user while the user is external to the helicopter and wearing the harness.

In another embodiment of the apparatus outlined above, the harness component may be a Y-piece harness segment.

In still another embodiment of the apparatus outlined above, the harness component may be a lanyard. In yet another embodiment, the lanyard may be a Capewell lanyard.

In an additional embodiment of the apparatus outlined above, the harness component may be a dielectric rope. In a further embodiment, the harness component may further comprise a Y-lanyard having a top end and two bottom ends. The top end of the Y-lanyard is attachable to the bottom end of the dielectric rope, and the two bottom ends of the Y-lanyard are attachable to the personal harness. In still a further embodiment, the apparatus may further comprise a carabineer installable between the bottom end of the dielectric rope and the top end of the Y-lanyard.

In yet another embodiment of the apparatus outlined above, the apparatus may further comprise a rescue strop attachable to the fitting of the helicopter hoist.

In a further embodiment of the apparatus outlined above, the apparatus may further comprise a stretcher with an associated bridle. The bridle being attachable to the fitting of the helicopter hoist.

In some embodiments, the apparatus outlined above may further comprise a hoist ring installable between the fitting of the helicopter hoist and the harness component.

In some embodiments, the apparatus may further comprise a hoist ring installable between the fitting of the helicopter hoist and the harness component, the rescue strop, or both.

In some embodiments, the apparatus may further comprise a hoist ring installable between the fitting of the helicopter hoist and the harness component, the stretcher with the associated bridle, or both.

In an embodiment, the apparatus outlined above may further comprise a carabineer installable between the fitting of the helicopter hoist and the harness component.

In some embodiments, the apparatus outlined above may further comprise: a first carabineer installable between the fitting of the helicopter hoist and the harness component; a second carabineer installable between the fitting of the helicopter hoist and the rescue strop; or both.

In additional embodiments, the apparatus outlined above may further comprise: a first carabineer installable between the fitting of the helicopter hoist and the harness component; a second carabineer installable between the fitting of the helicopter hoist and the stretcher with the associated bridle; or both.

In an additional embodiment, the apparatus may further comprise a carabineer installable between the hoist ring and the harness component.

In some embodiments, the apparatus outlined above may further comprise: a first carabineer installable between the hoist ring and the harness component; a second carabineer installable between the hoist ring and the rescue strop; or both.

In some embodiments, the apparatus outlined above may further comprise: a first carabineer installable between the hoist ring and the harness component; a second carabineer installable between the hoist ring and the stretcher with the associated bridle; or both.

In further embodiments of the apparatus outlined above, the apparatus may further comprise a carabineer installable between the personal harness and the harness component.

In an embodiment, the present invention provides for a method for supporting a human external cargo from a hoist-equipped helicopter using an apparatus as outlined herein. The method comprising the steps of: supporting an external user wearing the personal harness, through the harness component, from the hoist of the helicopter; and positioning the helicopter and the helicopter hoist so as to stabilize and maintain the user at a desired position.

In an additional embodiment, the present invention provides for a method for supporting a human external cargo from a hoist-equipped helicopter while in the vicinity of one or more energized power lines using an apparatus as outlined herein. The method comprising: supporting an external user wearing the personal harness, through the dielectric rope, from the hoist of the helicopter; and positioning the helicopter and the helicopter hoist so as to stabilize and maintain the user at a desired position. The dielectric rope electrically insulates the user and the helicopter from the one or more energized power lines.

In an additional embodiment, the present invention provides for a method for supporting a human external cargo from a hoist-equipped helicopter during a rescue operation using an apparatus as outlined herein. The method comprising: supporting an external user wearing the personal harness, through the harness component, from the hoist of the helicopter; positioning the helicopter and the helicopter hoist so as to stabilize and maintain the user at a desired position for performing a rescue operation; and supporting a rescued subject in the rescue strop or the stretcher.

In some embodiments, the present invention provides for an apparatus for supporting human external cargo from a hoist-equipped helicopter while in the vicinity of one or more energized power lines. The apparatus comprising: a personal harness for supporting a user; a dielectric rope, the dielectric rope having a bottom end directly or indirectly joinable to the personal harness, and a top end directly or indirectly joinable to a fitting of the helicopter hoist. The dielectric rope electrically insulates the user and the helicopter from the one or more energized power lines. The helicopter, the helicopter hoist, the dielectric rope, and the personal harness externally support the user in a position near one or more energized power lines.

In a further embodiment of the apparatus outlined above, the apparatus may further comprise a Y-lanyard installed between the personal harness and the dielectric rope.

In some embodiments, the present invention provides for an apparatus for supporting human external cargo from a hoist-equipped helicopter. The apparatus comprising: a personal harness for supporting a user; and a Y-piece harness segment with a top end point attachable to a fitting of the helicopter hoist, and two bottom end points, each of which are directly or indirectly attachable to the personal harness. The helicopter, the helicopter hoist, the Y-piece harness segment, and the personal harness externally support the user in a desired position.

In additional embodiments, the present invention provides for an apparatus for supporting human external cargo from a hoist-equipped helicopter. The apparatus comprising: a personal harness for supporting a user; and a lanyard with a top end point attachable to a fitting of the helicopter hoist, and a bottom end point which is directly or indirectly attachable to the personal harness. The helicopter, the helicopter hoist, the lanyard, and the personal harness externally support the user in a desired position.

In a further embodiment of the apparatus outlined above, the lanyard may be a Capewell lanyard.

In some embodiments, the present invention provides for an apparatus for supporting human external cargo from a hoist-equipped helicopter. The apparatus comprising: a first supporting apparatus comprising: a personal harness for supporting a user; and a lanyard with a top end point attachable to a fitting of the helicopter hoist, and a bottom end point which is directly or indirectly attachable to the personal harness, and a second supporting apparatus. The second supporting apparatus comprising: a rescue strop attachable to the fitting of the helicopter hoist for supporting a rescued subject. The first supporting apparatus externally supports the user from the helicopter hoist, and the second supporting apparatus externally supports the rescued subject from the helicopter hoist.

In a further embodiment of the apparatus outlined above, the lanyard may be a Capewell lanyard.

In additional embodiments, the present invention provides for an apparatus for supporting human external cargo from a hoist-equipped helicopter. The apparatus comprising: a first supporting apparatus comprising: a personal harness for supporting a user; and a Y-piece harness segment with a top end point attachable to a fitting of the helicopter hoist, and two bottom end points, each of which are directly or indirectly attachable to the personal harness; and a second supporting apparatus. The second supporting apparatus comprising: a rescue strop attachable to the fitting of the helicopter hoist for supporting a rescued subject. The first supporting apparatus externally supports the user from the helicopter hoist, and the second supporting apparatus externally supports the rescued subject from the helicopter hoist.

In additional embodiments, the present invention provides for an apparatus for supporting human external cargo from a hoist-equipped helicopter. The apparatus comprising: a first supporting apparatus comprising: a personal harness for supporting a user; and a lanyard with a top end point attachable to a fitting of the helicopter hoist, and a bottom end point which is directly or indirectly attachable to the personal harness; and a second supporting apparatus comprising: a stretcher and bridle attachable to the fitting of the helicopter hoist for supporting a rescued subject. The first supporting apparatus externally supports the user from the helicopter hoist, and the second supporting apparatus externally supports the rescued subject from the helicopter hoist.

In a further embodiment of the apparatus outlined above, the lanyard may be a Capewell lanyard.

In some embodiments, the present invention provides for an apparatus for supporting human external cargo from a hoist-equipped helicopter. The apparatus comprising: a first supporting apparatus comprising: a personal harness for supporting a user; and a Y-piece harness segment with a top end point attachable to a fitting of the helicopter hoist, and two bottom end points, each of which are directly or indirectly attachable to the personal harness; and a second supporting apparatus comprising: a stretcher and bridle attachable to the fitting of the helicopter hoist for supporting a rescued subject. The first supporting apparatus externally supports the user from the helicopter hoist, and the second supporting apparatus externally supports the rescued subject from the helicopter hoist.

BRIEF DESCRIPTION OF THE DRAWINGS

These and other features, aspects and advantages of the present invention will become better understood with regard to the following description and accompanying drawings wherein.

DETAILED DESCRIPTION

Described herein are apparatus and methods for supporting human external cargo from the hoist of a hoist-equipped helicopter. It will be appreciated that the apparatus, methods, and embodiments described herein are not meant to be limiting in any way. Any reference to embodiments or examples throughout this disclosure should be considered a reference to an illustrative and non-limiting embodiment or an illustrative and non-limiting example.

Figure 1:
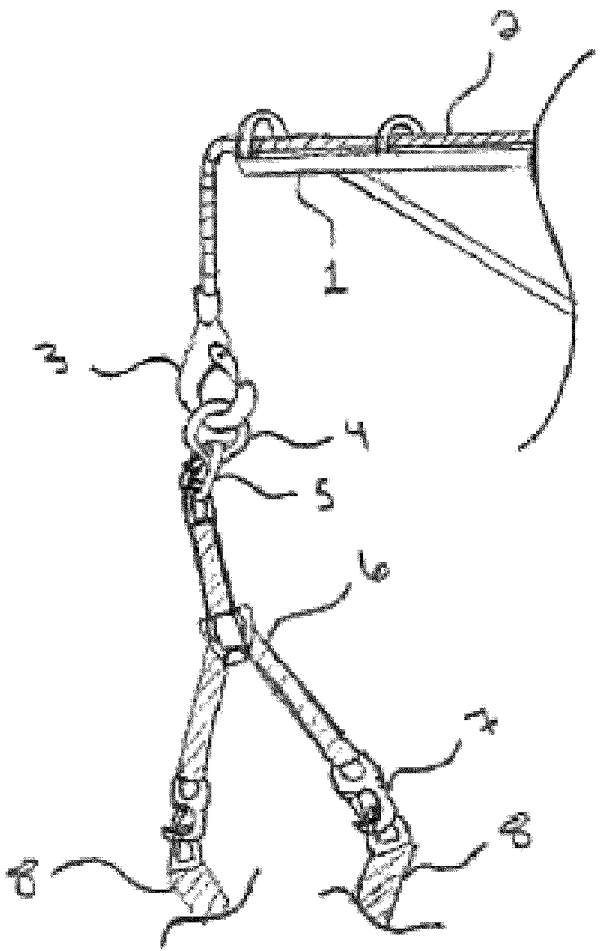
FIG. 1 shows an illustration of an assembled apparatus for supporting human external cargo from a hoist-equipped helicopter according to an embodiment of the present invention.

An embodiment of an apparatus for supporting human external cargo from a hoist-equipped helicopter is illustrated in FIG. 1. In the illustrated apparatus, a helicopter hoist (1) is equipped with a hoist cable (2) with an associated hoist hook (3). The hoist (1) may be retracted or extended to change the length of the hoist cable (2) extending from the hoist (1). Attached to the hoist hook (3) is an optional hoist ring (4) with an optionally associated carabineer (5). A Y-piece harness segment (6), having a top end and two bottom ends, may be attached to the hoist ring (4) or the carabineer (5) or directly to the hoist hook (3) through the top end. The bottom ends of the Y-piece harness segment (6) may be attached to a two-point person harness (8). During operation, a user wearing the personal harness (8) may be supported, maintained, or otherwise stabilized in a desired position by the apparatus and helicopter. By way of example, a helicopter may be positioned in the vicinity of a difficult-to-access location such as the top of a building or tower, and a user wearing the personal harness (8) and desiring to access a site on the building or tower may be lowered from the helicopter via extension or unwinding of the hoist cable (3) until the user is safely supported at the site on the building or tower. A user may then perform an operation at the site, such as a maintenance or repair, while being safely supported/stabilized from above by the helicopter.

Figure 2:
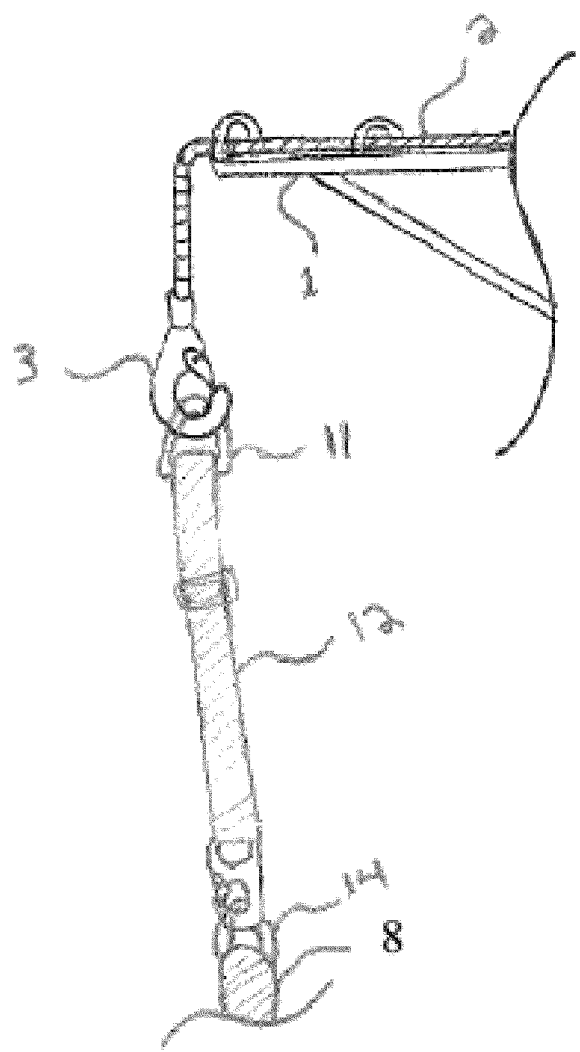
FIG. 2 shows an illustration of an assembled apparatus for supporting human external cargo from a hoist-equipped helicopter according to a further embodiment of the present invention.

Another embodiment of an apparatus for supporting human external cargo from a hoist-equipped helicopter is illustrated in FIG. 2. In the illustrated apparatus, a helicopter hoist (1) is equipped with a hoist cable (2) with an associated hoist hook (3). The hoist (1) may be retracted or extended to change the length of the hoist cable (2) extending from the hoist (1). A lanyard (12), for example, but not limited to, a Capewell lanyard, is attached to the hoist hook (3) at the top end of the lanyard (12) through an integrated fitting (11). The bottom end of the lanyard (12) may then be attached to a personal harness (8) through a second integrated fitting (13) and, optionally, a carabineer. During operation, a user wearing the personal harness (8) may be supported, maintained, or otherwise stabilized in a desired position by the apparatus and helicopter, for example as described above.

Figure 3:
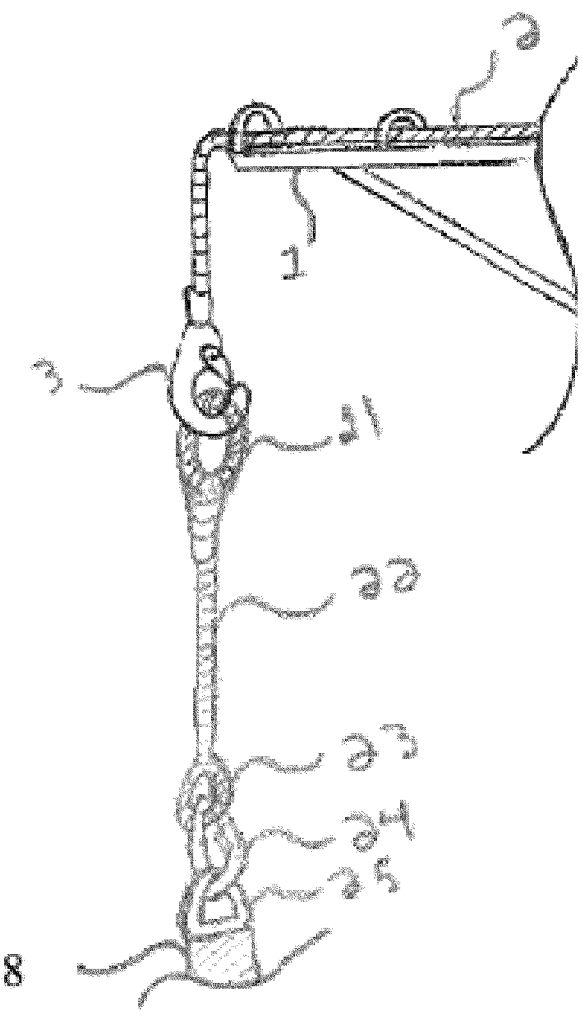
FIG. 3 shows an illustration of an assembled apparatus for supporting human external cargo from a hoist-equipped helicopter optionally while in the vicinity of one or more energized power lines according to an embodiment of the present invention.

FIG. 3 depicts another embodiment of an apparatus for supporting human external cargo from a hoist-equipped helicopter optionally while in the vicinity of one or more energized power lines. In the illustrated apparatus, a helicopter hoist (1) is equipped with a hoist cable (2) with an associated hoist hook (3). The hoist (1) may be retracted or extended to change the length of the hoist cable (2) extending from the hoist (1). A dielectric rope (22) may be attached to the hoist hook (3) at a top end of the dielectric rope (22), optionally through a fitting, eye splice, or loop (21) optionally integrated into the dielectric rope (22). A personal harness (8) may be attached to the bottom end of the dielectric rope (22), optionally through one or more integrated fittings (25), and optionally through a carabineer (24). The bottom end of the dielectric rope (22) may optionally have a fitting, eye splice, or loop (23), optionally integrated into the dielectric rope (22), to facilitate the attachment to the personal harness (26).

During operation of the apparatus depicted in FIG. 3, a user wearing the personal harness (8) may be supported, maintained, or otherwise stabilized in a desired position, optionally in the vicinity of one or more energized power-lines or other electrical components, by the apparatus and helicopter. By way of example, a helicopter may be positioned in the vicinity of a difficult-to-access location on or near hydroelectric lines or towers, and a user wearing the personal harness (8) and desiring to access a site on the hydroelectric lines or towers may be lowered from the helicopter via extension of the hoist cable (3) and positioning of the helicopter until the user is safely supported at the site on the hydroelectric structure. A user may then perform an operation at the site, such as a maintenance or repair, while being safely supported/stabilized from above by the helicopter. The dielectric rope (22) may electrically insulate the user, and the helicopter, from the one or more energized power lines or electrical components in case of contact.

Figure 4:
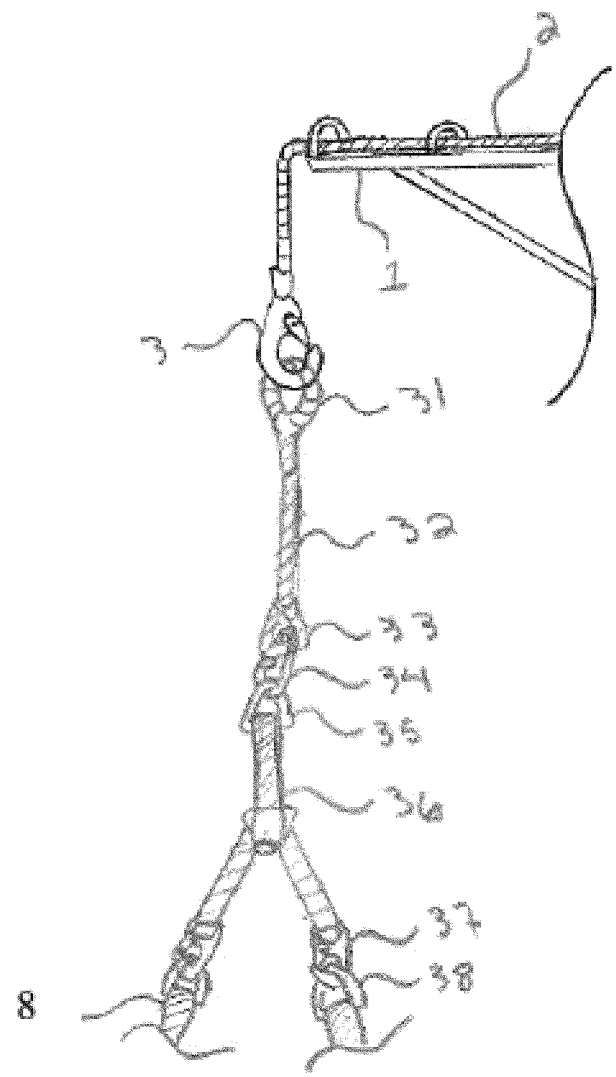
FIG. 4 shows an illustration of an assembled apparatus for supporting human external cargo from a hoist-equipped helicopter optionally while in the vicinity of one or more energized power lines according to a further embodiment of the present invention.

FIG. 4 illustrates a further embodiment of an apparatus for supporting human external cargo from a hoist-equipped helicopter optionally while in the vicinity of one or more energized power lines. In the illustrated apparatus, a helicopter hoist (1) is equipped with a hoist cable (2) with an associated hoist hook (3). The hoist (1) may be retracted or extended to change the length of the hoist cable (2) extending from the hoist (1). A dielectric rope (32) may be attached to the hoist hook (3) at a top end of the dielectric rope (32), optionally through a fitting, eye splice, or loop (31) optionally integrated into the dielectric rope (32). The bottom end of the dielectric rope (32) may be attached to the top end of a Y-lanyard (36), optionally through an integrated fitting (35) and optionally through a carabineer (34). The bottom end of the dielectric rope (32) may optionally have a fitting, eye splice, or loop (33), optionally integrated into the dielectric rope (32), to facilitate the attachment. The two bottom ends of Y-lanyard (36) may be attached to a personal harness (8), optionally through one or more integrated fittings (38). The operation of the apparatus illustrated in FIG. 4 may be, for example, similar to that described above with reference to FIG. 3.

Figure 5:
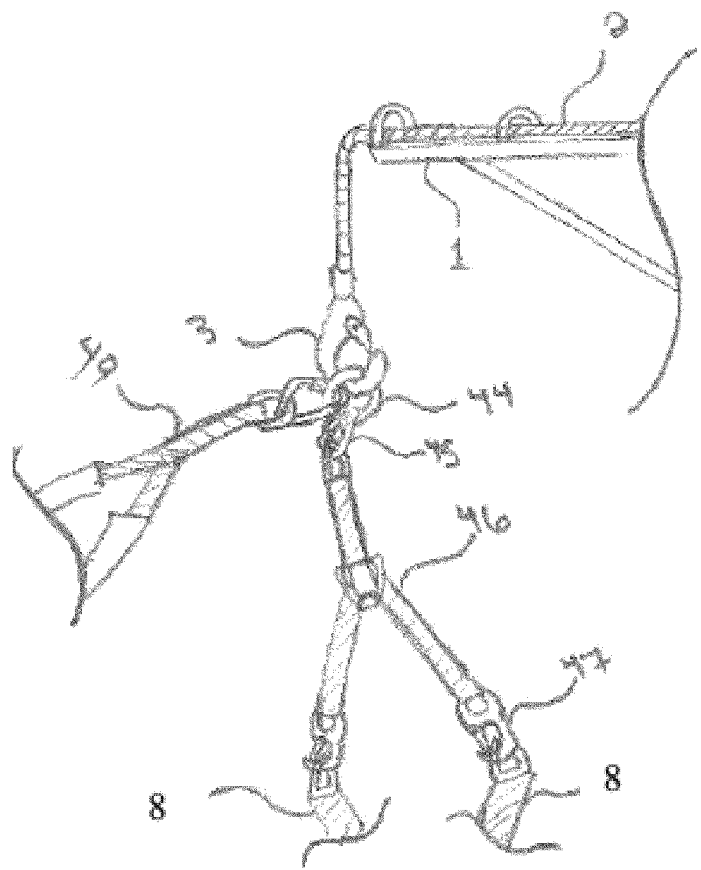
FIG. 5 shows an illustration of an assembled apparatus for supporting human external cargo from a hoist-equipped helicopter, which may optionally be used for rescue operations, according to an embodiment of the present invention.

FIG. 5 illustrates an embodiment of an apparatus for supporting human external cargo from a hoist-equipped helicopter optionally during rescue operations. In the illustrated apparatus, a helicopter hoist (1) is equipped with a hoist cable (2) with an associated hoist hook (3). The hoist (1) may be retracted or extended to change the length of the hoist cable (2) extending from the hoist (1). A hoist ring (44) may be attached to the hoist hook (3). A first supporting apparatus comprising a Y-piece harness segment (46) and a personal harness (8) may be installed. In the first supporting apparatus, the Y-piece harness segment (46), having a top end and two bottom ends, may be attached to the hoist ring (4) or the hoist hook (3), optionally through a carabineer (45), at the top end, and the bottom ends of the Y-piece harness segment (46) may be attached to the personal harness (8). A second supporting apparatus comprising a rescue strop (49) may also be installed. In the second supporting apparatus, the rescue strop (49) may be attached to the hoist ring (44) or the hoist hook (3), optionally through a carabineer, at the top end of the rescue strop (49). During operation, a user wearing the personal harness (8) and supported by the first supporting apparatus may perform a rescue operation wherein a second user is rescued and supported in the rescue strop of the second supporting apparatus.

Figure 6:
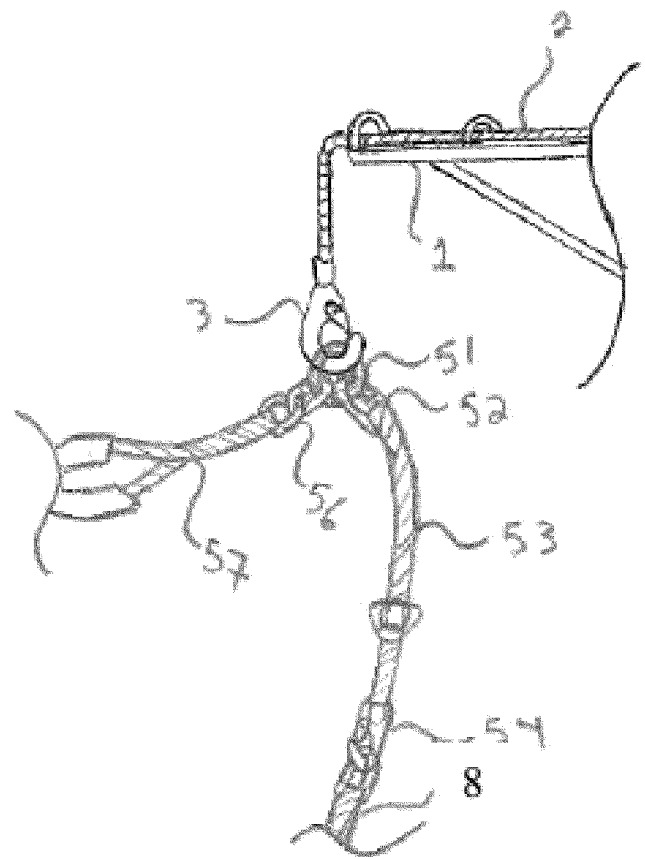
FIG. 6 shows an illustration of an assembled apparatus for supporting human external cargo from a hoist-equipped helicopter, which may optionally be used for rescue operations, according to a further embodiment of the present invention.

FIG. 6 illustrates an embodiment of an apparatus for supporting human external cargo from a hoist-equipped helicopter optionally during rescue operations. In the illustrated apparatus, a helicopter hoist (1) is equipped with a hoist cable (2) with an associated hoist hook (3). The hoist (1) may be retracted or extended to change the length of the hoist cable (2) extending from the hoist (1). A hoist ring (51) may be attached to the hoist hook (3). A first supporting apparatus comprising a lanyard (for example, a Capewell lanyard) (53) and a personal harness (8) may be installed. In the first supporting apparatus, the lanyard (53), having a top end and a bottom end, may be attached to the hoist ring (51) or the hoist hook (3), optionally through a carabineer (52) and an optional integrated fitting, at the top end, and the bottom end of the lanyard (53) may be attached to the personal harness (55) through an optional integrated fitting (54) and an optional carabineer. A second supporting apparatus comprising a rescue strop (57) may also be installed. In the second supporting apparatus, the rescue strop (57) may be attached to the hoist ring (51) or the hoist hook (3), optionally through a carabineer (56), at the top end of the rescue strop (57). During operation, a user wearing the personal harness (55) and supported by the first supporting apparatus may perform a rescue operation wherein a second user is rescued and supported in the rescue strop of the second supporting apparatus.

Figure 7A:
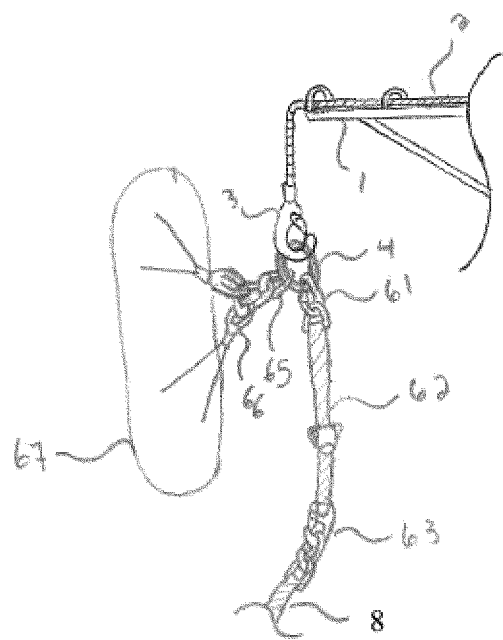
FIGS. 7A and 7B show an illustration of an assembled apparatus for supporting human external cargo from a hoist-equipped helicopter, which may optionally be used for rescue operations, according to an additional embodiment of the present invention.
Figure 7B:
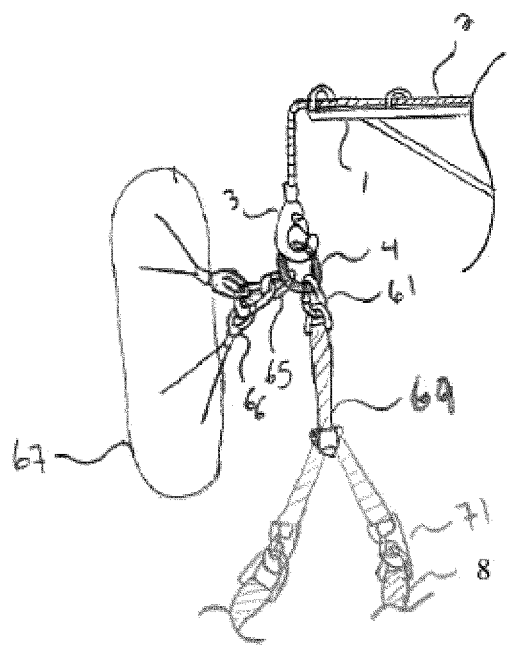

FIGS. 7A and 7B illustrate an embodiment of an apparatus for supporting human external cargo from a hoist-equipped helicopter optionally during rescue operations. In the apparatus illustrated in FIGS. 7A and 7B, a helicopter hoist (1) is equipped with a hoist cable (2) with an associated hoist hook (3). The hoist (1) may be retracted or extended to change the length of the hoist cable (2) extending from the hoist (1). A hoist ring (4) may be attached to the hoist hook (3). A first supporting apparatus comprising a lanyard (for example, a Capewell lanyard) (62) and a personal harness (8) may be installed. In the first supporting apparatus, the lanyard (62), having a top end and a bottom end, may be attached to the hoist ring (4) or the hoist hook (3), optionally through a carabineer (61) and an optional integrated fitting, at the top end, and the bottom end of the lanyard (62) may be attached to the personal harness (8) through an optional integrated fitting (63) and an optional carabineer. A second supporting apparatus comprising a stretcher (67) and bridle (66) may also be installed. In the second supporting apparatus, the stretcher (67) and bridle (66) may be attached to the hoist ring (4) or the hoist hook (3), optionally through a carabineer (65), at the top end of the bridle (66). During operation, a user wearing the personal harness (8) and supported by the first supporting apparatus may perform a rescue operation wherein a second user is rescued and supported in the stretcher (67) of the second supporting apparatus.

In the apparatus illustrated in FIGS. 7A and 7B, a helicopter hoist (1) may be equipped with a hoist cable (2) with an associated hoist hook (3). The hoist (1) may be retracted or extended to change the length of the hoist cable (2) extending from the hoist (1). A hoist ring (4) may be attached to the hoist hook (3). A first supporting apparatus comprising a Y-piece harness segment (69) and a personal harness (72) may be installed. In the first supporting apparatus, the Y-piece harness segment (69), having a top end and two bottom ends, may be attached to the hoist ring (4) or the hoist hook (3), optionally through a carabineer (61) and an optional integrated fitting, at the top end, and the bottom ends of the Y-piece harness segment (69) may be attached to the personal harness (72) through an optional integrated fitting (71) and an optional carabineer. A second supporting apparatus comprising a stretcher (67) and bridle (66) may also be installed. In the second supporting apparatus, the stretcher (67) and bridle (66) may be attached to the hoist ring (4) or the hoist hook (3), optionally through a carabineer (65), at the top end of the bridle (66). During operation, a user wearing the personal harness (8) and supported by the first supporting apparatus may perform a rescue operation wherein a second user is rescued and supported in the stretcher (67) of the second supporting apparatus.

As will be understood, the embodiments described herein are for illustrative purposes only. The person of skill in the art will readily understand that various alternative arrangements and configurations are also possible and contemplated herein. The skilled person will understand that a variety of fittings, hooks, carabineers, harnesses, and other equipment known in the field can be readily substituted or incorporated into the configurations described herein, depending on the specific application, the needs of the user, and/or the safety requirements to be met.

The helicopter hoist described herein may be any suitable helicopter hoist or substitute thereof known in the art. By way of non-limiting example, the helicopter hoist may be a Heli-Dyne Goodrich hoist. The helicopter hoist may have a fitting, for example a hoist hook. The fitting of the helicopter hoist may be any suitable hook, clip, or other suitable attachment point known in the field.

Any suitable personal harness or substitute thereof may be used in the apparatus for supporting human external cargo from the hoist of a hoist-equipped helicopter. By way of non-limiting example, a suitable harness may include one of the following harnesses: a DBI Sala harness (for example, a DBI Sala ExoFit XP Tower Climbing Harness Global Wind Harness, or an ExoFit NEX Wind Energy Harness); a Petzl Fast Harness (for example, a Petzl Navaho Bod Croll Fast Harness); a Sets Restraint Harness; a Yates Tactical Harness (for example, a Yates Tactical Full Body Harness, 360); or a Yates Tower Access Harness (for Example, a Tower Access Harness, 390).

Suitable carabineers for use in the present apparatus may include, but are not limited to, DMM Twist Gate Carabineers (for example, a DMM Locking Connector Twist Gate Carabineer), and PenSafe Carabineers.

Suitable hoist rings or substitutes thereof can include the PenSafe hoist ring.

It will be understood that the harness component, intermediate between the personal harness and the hoist, may include any number of components such as, but are not limited to, one or more dielectric ropes, Y-piece harness segments, lanyards, Capewell lanyards, or combinations thereof. The harness component may, in some embodiments, comprise one or more integrated loops, hooks, eyelets, eye splices, fittings, clips, or other attachment points or attachable fittings.

The dielectric rope described herein may be any suitable dielectric rope or substitute thereof known in the art. In some non-limiting embodiments, the dielectric rope may be an 8-strand rope. The dielectric rope may, in some embodiments, be constructed from Hy-Dee Brait ⅝" diameter rope. In some non-limiting embodiments, the rope may have a minimum length of 20 feet, and/or a maximum length of 30 feet, as measured between the eyelets. The dielectric rope may, in some cases, comprise a "co-polymer" component, and/or may have high di-electric properties. In some embodiments, the rope may have a suitable eye splice on either end, each of which may optionally have a thimble seated therein.

Any suitable Y-piece harness segment or substitute thereof known in the art may be used in the apparatus for supporting human external cargo from the hoist of a hoist-equipped helicopter. One non-limiting example of a suitable Y-piece harness segment may be a Sets Y-Piece.

Suitable lanyards amenable for use in the apparatus for supporting human external cargo from the hoist of a hoist-equipped helicopter may include, but are not limited to, Sets Crew Lanyards and Sets Restraint Straps.

Suitable rescue strops amenable for use in the apparatus for supporting human external cargo from the hoist of a hoist-equipped helicopter may, in some embodiments, comprise one or more integrated loops, hooks, eyelets, eye splices, fittings, clips, or other attachment points or attachable fittings. A non-limiting example of a suitable rescue strops may include, but is not limited to, a Sets Rescue Strop.

Suitable stretchers and bridals amenable for use in the apparatus for supporting human external cargo from the hoist of a hoist-equipped helicopter may, in some embodiments, comprise one or more integrated loops, hooks, eyelets, eye splices, fittings, clips, or other attachment points or attachable fittings. A non-limiting example of a suitable stretcher may include, but is not limited to, a TSL Garda Stretcher or a Franco Garda Rescue Stretcher. A non-limiting example of a suitable bridal may include, but is not limited to, a Bridal Lanyard for Stretcher.

In some embodiments, the apparatus for supporting human external cargo from the hoist of a hoist-equipped helicopter may conform to safety guidelines/requirements/regulations for the specific applications to be performed. In one non-limiting example, the apparatus may conform to the requirements of technical standard order TSO-C167, and/or meet the Airworthiness Approved certification, or comparable standards.

In one non-limiting example, the apparatus depicted in FIG. 1 may be used by a user in a method for accessing a site which is, for example, near the top of a tower. The user, wearing the personal harness shown in FIG. 1, may be lifted in a helicopter to a position near and above the site to be accessed. The helicopter is equipped with a helicopter hoist having a hoist cable with an associated hoist hook. The top end of the Y-piece harness shown in FIG. 1 may be attached to the hoist hook, and the two bottom ends of the Y-piece harness may be attached to the personal harness worn by the user. When the helicopter is in position near the top of the tower, the user may be lowered from the helicopter while supported by the apparatus in FIG. 1 and the hoist/helicopter. The positioning of the user external to the helicopter may be adjusted by repositioning of the helicopter and/or extending or withdrawing the hoist cable as desired. In this manner, the user may be positioned and stabilized/supported at the desired site near the top of the tower, allowing the user to safely perform an operation at the site.

In another non-limiting example, the apparatus depicted in FIG. 3 may be used by a user in a method for accessing a site which is, for example, near the top of a hydroelectric tower near energized power lines. The user, wearing the personal harness shown in FIG. 3, may be lifted in a helicopter to a position near and above the site to be accessed. The helicopter is equipped with a helicopter hoist having a hoist cable with an associated hoist hook. The top end of the dielectric rope shown in FIG. 3 may be attached to the hoist hook through an eyelet or eye splice optionally having a thimble seated therein, and the bottom end of the dielectric rope may be attached to the personal harness worn by the user, optionally through a carabineer. When the helicopter is in position near the top of the tower, the user may be lowered from the helicopter while supported by the apparatus in FIG. 3 and the hoist/helicopter. The positioning of the user external to the helicopter may be adjusted by repositioning of the helicopter and/or extending or withdrawing the hoist cable as desired. In this manner, the user may be positioned and stabilized/supported at the desired site near the top of the hydroelectric tower near energized power lines, allowing the user to safely perform an operation at the site. The dielectric rope may insulate the user and/or the helicopter cable/hoist/helicopter from the energized power lines in case of contact.

What is claimed is:

1. An apparatus supporting human external cargo from a hoist of a hoist-equipped helicopter, the apparatus comprising:
    a personal harness for supporting a user; and
    a harness component with at least a top end and at least one bottom end;
    wherein the at least one bottom end of the harness component is attachable to the personal harness, and the at least one top end of the harness component is attachable to a fitting of the helicopter hoist, and wherein the harness component is a dielectric rope having a top end and a bottom end and each end having a fitting, eye splice or loop and the harness component further comprises a Y-shaped lanyard having a top end and two bottom ends, wherein the top end of the Y-shaped lanyard is attachable to the bottom end of the dielectric rope, and the two bottom ends of the Y-shaped lanyard are attachable to the personal harness.

2. The apparatus of claim 1 further comprising a rescue strop attachable to the fitting of the helicopter hoist.

3. The apparatus according to claim 1, further comprising a stretcher with an associated bridle, wherein the bridle is attachable to the fitting of the helicopter hoist.

4. The apparatus according to claim 2, further comprising a hoist ring installable between the fitting of the helicopter hoist and the harness component, the rescue strop, or both.

5. The apparatus according to claim 3, further comprising a hoist ring installable between the fitting of the helicopter hoist and the harness component, the stretcher with the associated bridle, or both.

6. The apparatus according to claim 1, further comprising a carabineer installable between the fitting of the helicopter hoist and the harness component.

7. The apparatus according to claim 2, further comprising:
a first carabineer installable between the fitting of the helicopter hoist and the harness component; or
a second carabineer installable between the fitting of the helicopter hoist and the rescue strop;
or both, the first carabineer installable between the fitting of the helicopter hoist and the harness component and the second carabineer installable between the fitting of the helicopter hoist and the rescue strop.

8. The apparatus according to claim 3, further comprising:
a first carabineer installable between the fitting of the helicopter hoist and the harness component; or
a second carabineer installable between the fitting of the helicopter hoist and the stretcher with the associated bridle;
or both, the first carabineer installable between the fitting of the helicopter hoist and the harness component and the second carabineer installable between the fitting of the helicopter hoist and the stretcher with the associated bridle.

9. The apparatus according to claim 1, further comprising a carabineer installable between the personal harness and the harness component.

10. The apparatus according to claim 1, wherein the Y-shaped lanyard has a loop at the top end and hooks on each of the two bottom ends.

11. The apparatus according to claim 10, wherein the top end of the Y-shaped lanyard is attached to the bottom end of the dielectric rope via a carabineer.

12. A method of supporting a human external cargo from a hoist-equipped helicopter using the apparatus as defined in claim 1, the method comprising:
supporting an external user wearing the personal harness, through the harness component, from the hoist of the helicopter; and
positioning the helicopter and the helicopter hoist so as to stabilize and maintain the user at a desired position.

13. The method of claim 12, wherein the method is a method for supporting a human external cargo from a hoist-equipped helicopter while in the vicinity of one or more energized power lines, and wherein the dielectric rope electrically insulates the user and the helicopter from the one or more energized power lines.

\* \* \* \* \*